US012752491B2

(12) United States Patent
Schiel et al.

(10) Patent No.: US 12,752,491 B2
(45) Date of Patent: Oct. 6, 2026

(54) 3D PRINTER STATUS AND HEALTH MONITORING WITH ILLUMINATED STATUS DISPLAY INDICATOR

(71) Applicant: Stratasys, Inc., Minnetonka, MN (US)

(72) Inventors: Colin Schiel, Chaska, MN (US); Brett Johnson, Roseville, MN (US); Ross Michalkiewicz, Minneapolis, MN (US)

(73) Assignee: STRATASYS, INC., Minnetonka, MN (US)

( * ) Notice: Subject to any disclaimer, the term of this patent is extended or adjusted under 35 U.S.C. 154(b) by 367 days.

(21) Appl. No.: 18/322,201

(22) Filed: May 23, 2023

(65) Prior Publication Data

US 2024/0391175 A1 Nov. 28, 2024

(51) Int. Cl.
*B29C 64/393* (2017.01)
*B29C 64/118* (2017.01)
*B33Y 30/00* (2015.01)
*B33Y 50/02* (2015.01)

(52) U.S. Cl.
CPC ............ *B29C 64/393* (2017.08); *B33Y 30/00* (2014.12); *B33Y 50/02* (2014.12); *B29C 64/118* (2017.08)

(58) Field of Classification Search
CPC ... B29C 64/393; B29C 64/118; B29C 64/209; B33Y 30/00; B33Y 50/02
See application file for complete search history.

(56) References Cited

U.S. PATENT DOCUMENTS

| | | | |
|---|---|---|---|
| 4,802,864 | A | 2/1989 | Michaels et al. |
| 5,121,329 | A | 6/1992 | Crump |
| 5,181,433 | A | 1/1993 | Ueno et al. |
| 5,340,433 | A | 8/1994 | Crump |
| 5,503,785 | A | 4/1996 | Crump et al. |
| 5,866,058 | A | 2/1999 | Batchelder et al. |

(Continued)

FOREIGN PATENT DOCUMENTS

| | | |
|---|---|---|
| CN | 207044697 U | 2/2018 |
| CN | 305362203 | 3/2019 |

(Continued)

OTHER PUBLICATIONS

KR_20160041240 (Year: 2016).*

(Continued)

*Primary Examiner* — Xiao S Zhao
(74) *Attorney, Agent, or Firm* — Westman, Champlin & Koehler, P.A.

(57) ABSTRACT

A 3D printer includes a chamber configured to receive extruded material to print a part and a tool chamber above the chamber, the tool chamber comprising a viewing window and a tool rack. The 3D printer includes a plurality of print heads, each of the plurality of print heads residing in a docked position on the tool rack and when not in use. Each of the plurality of print heads comprising a illuminated status indicator configured to emit a plurality of signals indicative of a status or error of the print head or a status of the 3D printer, wherein the illuminated status indicator faces the viewing window and a plurality of sensors located on the print head or in the 3D printer and configured to detect a status of the print head or other printer components or an error in the print head or other printer components.

20 Claims, 14 Drawing Sheets

(56) References Cited

U.S. PATENT DOCUMENTS

| | | | | |
|---|---|---|---|---|
| 6,004,124 | A | 12/1999 | Swanson et al. | |
| 6,022,207 | A | 2/2000 | Dahlin et al. | |
| 6,547,995 | B1 | 4/2003 | Comb | |
| 6,722,872 | B1 | 4/2004 | Swanson et al. | |
| 6,923,634 | B2 | 8/2005 | Swanson et al. | |
| 7,063,285 | B1 | 6/2006 | Turley et al. | |
| 7,127,309 | B2 | 10/2006 | Dunn et al. | |
| 7,297,304 | B2 | 11/2007 | Swanson | |
| 7,329,128 | B1 | 2/2008 | Awad | |
| 7,367,087 | B2 | 5/2008 | Colombo et al. | |
| 7,384,255 | B2 | 6/2008 | LaBossiere et al. | |
| 7,604,470 | B2 | 10/2009 | LaBossiere et al. | |
| 7,625,200 | B2 | 12/2009 | Leavitt | |
| 7,891,964 | B2 | 2/2011 | Skubic et al. | |
| 7,896,209 | B2 | 3/2011 | Batchelder et al. | |
| 7,897,074 | B2 | 3/2011 | Batchelder et al. | |
| 7,910,041 | B1 | 3/2011 | Priedeman, Jr. | |
| 7,938,356 | B2 | 5/2011 | Taatjes et al. | |
| 8,157,202 | B2 | 4/2012 | Taatjes et al. | |
| 8,403,658 | B2 | 3/2013 | Swanson | |
| 8,419,996 | B2 | 4/2013 | Swanson et al. | |
| 8,439,665 | B2 | 5/2013 | Batchelder et al. | |
| 8,465,111 | B2 | 6/2013 | Swanson et al. | |
| 8,512,024 | B2 | 8/2013 | Pax | |
| 8,647,102 | B2 | 2/2014 | Swanson et al. | |
| 8,926,882 | B2 | 1/2015 | Batchelder et al. | |
| 8,985,497 | B2 | 3/2015 | Mannella et al. | |
| 9,022,769 | B2 | 5/2015 | Swanson et al. | |
| 9,073,263 | B2 | 7/2015 | Mannella et al. | |
| 9,108,360 | B2 | 8/2015 | Comb et al. | |
| 9,168,689 | B2 | 10/2015 | Stoehr | |
| 9,168,699 | B2 | 10/2015 | Pax | |
| 9,233,504 | B2 | 1/2016 | Douglas et al. | |
| 9,321,609 | B2 | 4/2016 | Koop et al. | |
| 9,512,544 | B2 | 12/2016 | Heikkila | |
| 9,893,591 | B2 | 2/2018 | Farley et al. | |
| 10,022,917 | B2 | 7/2018 | Pax | |
| 10,494,219 | B2 | 12/2019 | Nadeau et al. | |
| 10,513,104 | B2 | 12/2019 | Barclay et al. | |
| 10,513,107 | B2 | 12/2019 | Flannigan et al. | |
| 10,556,381 | B2 | 2/2020 | Kemperle et al. | |
| 10,870,149 | B2 | 12/2020 | Oftedal | |
| D938,258 | S | 12/2021 | Johnson | |
| D938,259 | S | 12/2021 | Johnson | |
| 11,267,199 | B2 | 3/2022 | Smith et al. | |
| 11,485,085 | B2 | 11/2022 | Smith et al. | |
| 11,919,242 | B2 | 3/2024 | Bosveld et al. | |
| 11,994,412 | B2 | 5/2024 | Bosveld et al. | |
| 2003/0090752 | A1* | 5/2003 | Rosenberger | B33Y 30/00 359/15 |
| 2008/0213419 | A1 | 9/2008 | Skubic et al. | |
| 2009/0141477 | A1 | 6/2009 | Bhosale et al. | |
| 2009/0284387 | A1* | 11/2009 | Marchetti | G06K 15/005 340/815.45 |
| 2009/0295153 | A1 | 12/2009 | Knapp | |
| 2010/0096485 | A1 | 4/2010 | Taatjes | |
| 2010/0283172 | A1 | 11/2010 | Swanson | |
| 2013/0164960 | A1 | 6/2013 | Swanson | |
| 2014/0120196 | A1 | 5/2014 | Schmehl | |
| 2014/0159273 | A1 | 6/2014 | Koop et al. | |
| 2014/0276649 | A1 | 9/2014 | Ivosevic | |
| 2015/0084222 | A1 | 3/2015 | Heston et al. | |
| 2015/0108677 | A1 | 4/2015 | Mark et al. | |
| 2015/0140145 | A1 | 5/2015 | Schmehl | |
| 2016/0068793 | A1* | 3/2016 | Maggiore | C12M 41/12 901/22 |
| 2016/0257068 | A1* | 9/2016 | Albert | B29C 64/232 |
| 2016/0279876 | A1* | 9/2016 | Truchsess | B33Y 30/00 |
| 2016/0367358 | A1* | 12/2016 | Tran | A61L 27/54 |
| 2017/0057168 | A1 | 3/2017 | Miller et al. | |
| 2017/0120522 | A1* | 5/2017 | Skubic | B29C 64/118 |
| 2017/0173879 | A1* | 6/2017 | Myerberg | B22F 12/53 |
| 2017/0190108 | A1* | 7/2017 | Holland | B33Y 10/00 |
| 2017/0217013 | A1* | 8/2017 | Iqtidar | B29C 64/20 |
| 2017/0297111 | A1* | 10/2017 | Myerberg | B29C 64/209 |
| 2017/0361501 | A1 | 12/2017 | van der Zalm et al. | |
| 2018/0027615 | A1 | 1/2018 | Rios et al. | |
| 2018/0043627 | A1 | 2/2018 | Barclay et al. | |
| 2018/0154586 | A1 | 6/2018 | Wang et al. | |
| 2018/0169971 | A1* | 6/2018 | Rupel | B33Y 10/00 |
| 2018/0290365 | A1* | 10/2018 | Noorazar | B29C 48/92 |
| 2018/0304533 | A1 | 10/2018 | Burnham et al. | |
| 2018/0318926 | A1* | 11/2018 | Woods | B23K 26/0648 |
| 2018/0319079 | A1 | 11/2018 | Eyal et al. | |
| 2018/0345597 | A1 | 12/2018 | Wilenski et al. | |
| 2019/0086899 | A1* | 3/2019 | Wang | B33Y 50/02 |
| 2019/0091929 | A1 | 3/2019 | Harrison et al. | |
| 2019/0118258 | A1* | 4/2019 | Sachs | B29C 64/393 |
| 2019/0152154 | A1 | 5/2019 | Mantell | |
| 2019/0337298 | A1* | 11/2019 | Glassman | B41J 2/16508 |
| 2019/0381737 | A1* | 12/2019 | Sansare | B29C 64/393 |
| 2020/0001590 | A1 | 1/2020 | Holland et al. | |
| 2020/0002121 | A1 | 1/2020 | Manuel et al. | |
| 2020/0031046 | A1 | 1/2020 | Gjovik et al. | |
| 2020/0044393 | A1 | 2/2020 | Nishikawa | |
| 2020/0130231 | A1 | 4/2020 | Ruckborn et al. | |
| 2020/0130277 | A1 | 4/2020 | Thorpe et al. | |
| 2020/0215750 | A1 | 7/2020 | Long et al. | |
| 2020/0282644 | A1 | 9/2020 | Smith | |
| 2020/0282651 | A1 | 9/2020 | Chu et al. | |
| 2020/0307070 | A1 | 10/2020 | Swanson et al. | |
| 2020/0307081 | A1 | 10/2020 | Mantell et al. | |
| 2021/0069789 | A1 | 3/2021 | Moosberg et al. | |
| 2022/0016837 | A1 | 1/2022 | PeKarna et al. | |
| 2022/0254760 | A1* | 8/2022 | Kundaliya | H10H 29/14 |
| 2022/0288859 | A1* | 9/2022 | Schiel | B33Y 40/00 |
| 2022/0291663 | A1* | 9/2022 | Jaker | B33Y 50/00 |
| 2023/0028236 | A1* | 1/2023 | Leavitt | B29C 64/236 |
| 2023/0068289 | A1* | 3/2023 | Pino | B29C 64/371 |
| 2023/0131233 | A1* | 4/2023 | Lavdovsky | H01L 21/6875 438/795 |
| 2024/0009920 | A1 | 1/2024 | Anderson et al. | |
| 2024/0009924 | A1 | 1/2024 | Anderson et al. | |

FOREIGN PATENT DOCUMENTS

| | | | | | |
|---|---|---|---|---|---|
| CN | 305603635 | | | 6/2019 | |
| CN | 306423288 | | | 9/2020 | |
| CN | 306403296 | | | 10/2020 | |
| DE | 402015000024-0017 | | | 1/2015 | |
| EM | 002882795-001 | | | 11/2015 | |
| EP | 2117793 | A1 | | 11/2009 | |
| KR | 2016041240 | A | * | 4/2016 | |
| WO | 0189714 | A1 | | 11/2001 | |
| WO | 2008100467 | A1 | | 8/2008 | |
| WO | WO-2016115372 | A1 | * | 7/2016 | A61M 5/50 |
| WO | 2020102569 | A2 | | 5/2020 | |

OTHER PUBLICATIONS

WO 2016115372 (Year: 2016).*

International Search Report and Written Opinion from International Application No. PCT/US2019/061524, mailed Jun. 8, 2020.

Communication Pursuant to Rules 161(1) and 162 EPC From European Patent Application No. 19820930.6, Dated Jun. 22, 2021.

First Office Action From Chinese Patent Application No. 201990001142.6 Dated Dec. 9, 2021.

Bigtreetech Direct, MK8 CR10 Extruder Heatsink, Date first available Jun. 10, 2020 [online] retrieved Apr. 16, 2021, available from https://www.amazon.com/dp/B089YV5KNQ/ref-=sspa_dk_detail_9?psc=1&pd_rd_i=B089YV5KNQ&pd_rd_w=H6cMx&pf_rd_p=085568d9-3b13-4ac1-8 (Year: 2020).

Gulfcoast Robotics, Hotend Conversion, Date first available Nov. 5, 2019, [online] retrieved Apr. 16, 2021, available from https://www.amazon.com/Gulfcoast-Robotics-Conversion-Polished-Heatbreak/dp/B0811NWV2F/ref=pd_sbs_49?pd_rd_w=L7ysp&pf_rd_p=651d64d (Year: 2019).

(56) References Cited

OTHER PUBLICATIONS

POLISI3D, Extruder Titan, Extruder 3D Printer, Date first available Jul. 11, 2020, [online] retrieved Apr. 16, 2021, available from https://www.amazon.com/Dragonfly-Bimetal-Heatbreak-Upgrade-Extruder/dp/B08N6TBDT8/ref=pd_sbs_55?pd_rd_w-L7ysp&pf_rd_p=651d64d1-3c73-45b6-ae09-e545600e3a22&pf_rd_r=GE2C7S1ZJNG9G (Year: 2020).

* cited by examiner

3D PRINTER STATUS AND HEALTH MONITORING WITH ILLUMINATED STATUS DISPLAY INDICATOR

BACKGROUND

Additive manufacturing, also called 3D printing, is generally a process in which a three-dimensional (3D) part is built by adding material to form a part rather than subtracting material as in traditional machining. All references disclosed herein are incorporated by reference. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, MN), a part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print parts using fused deposition modeling techniques. The multi-axis system may include a robotic arm movable in six degrees of freedom. The multi-axis system may also include a build platform movable in two or more degrees of freedom and independent of the movement of the robotic arm to position the part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the part. The multiple axes of motion can utilize complex tool paths for printing parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a part in a single build plane, the geometry of part features may be used to determine the orientation of printing.

SUMMARY

The present disclosure relates to additive manufacturing systems for 3D printing of parts by material extrusion techniques. In particular, the present disclosure relates to a 3D printer having status and health monitoring with an illuminated display indicator.

Typically, the status and health of a 3D printer are discovered indirectly through defects and errors are found after the fact, in a part being printed, or when there is an issue with feeding the filament to a print head, and the printing job does not progress. As the 3D printing industry evolves as a manufacturing technology, there is a desire to keep printers continually producing parts with substantially no down time, and the need to resolve printer issues quickly. Additionally, with the increase in the number of print heads used in a single printer, the likelihood of a print head needing service or attention increases. There is a desire to be able to monitor the health and status of the one or more print heads in a 3D printer while a part is printed and conduct the necessary actions based upon the identified health and/or status of the print head.

An aspect of the present disclosure is directed to a 3D printer that includes a chamber configured to receive extruded material to print a part and a tool chamber above the chamber, the tool chamber comprising a viewing window and a tool rack. The 3D printer includes a plurality of print heads, each of the plurality of print heads residing in a docked position on the tool rack and when not in use and configured to receive a filament, melt the filament, and deposit the melted filament to form a part, each of the plurality of print heads comprising a illuminated status indicator configured to emit a plurality of signals indicative of a status or error of the print head or a status of the 3D printer, wherein the illuminated status indicator faces the viewing window and a plurality of sensors located on the print head or in the 3D printer and configured to detect a status of the print head or other printer components or an error in the print head or other printer components. A controller is configured to receive a signal from the at least one of the plurality of sensors and transmit a control signal to the at least one print head that causes the illuminated status indicator to emit a colored signal indicative of the detected status or error. The plurality of signals emitted by the illuminated status indicator communicates the detected status or a detected error through color, pulsing frequency, or both.

Another aspect of the present disclosure relates to a method of monitoring a status and health of a 3D printer. The method includes providing a 3D printer having a chamber configured to receive extruded material to print a part and a tool chamber above the chamber where the tool chamber comprising a viewing window and a tool rack. The provided 3D printer includes a plurality of print heads, each of the plurality of print heads residing in a docked position on the tool rack and when not in use and configured to receive a filament, melt the filament, and deposit the melted filament to form a part, each of the plurality of print heads comprising a illuminated status indicator configured to emit a plurality of signals indicative of a status or error each of the plurality of print heads, wherein the illuminated status indicator faces the viewing window. The printer also includes a plurality of sensors located on the print head or in the 3D printer and configured to detect a status of the print head or other printer components or an error in the print head or other printer components. The method includes visually monitoring a status and health of the 3D printer based upon the emitted signals from the plurality of print heads during a print job and maintaining the 3D printer based upon the emitted signals while the print job is taking place. The method further includes continuing to visually monitor the status and health of the 3D printer through light emitted from the plurality of print heads and maintaining the 3D printer based upon three emitted signals until the print job is complete.

DETAILED DESCRIPTION

Figure 1:
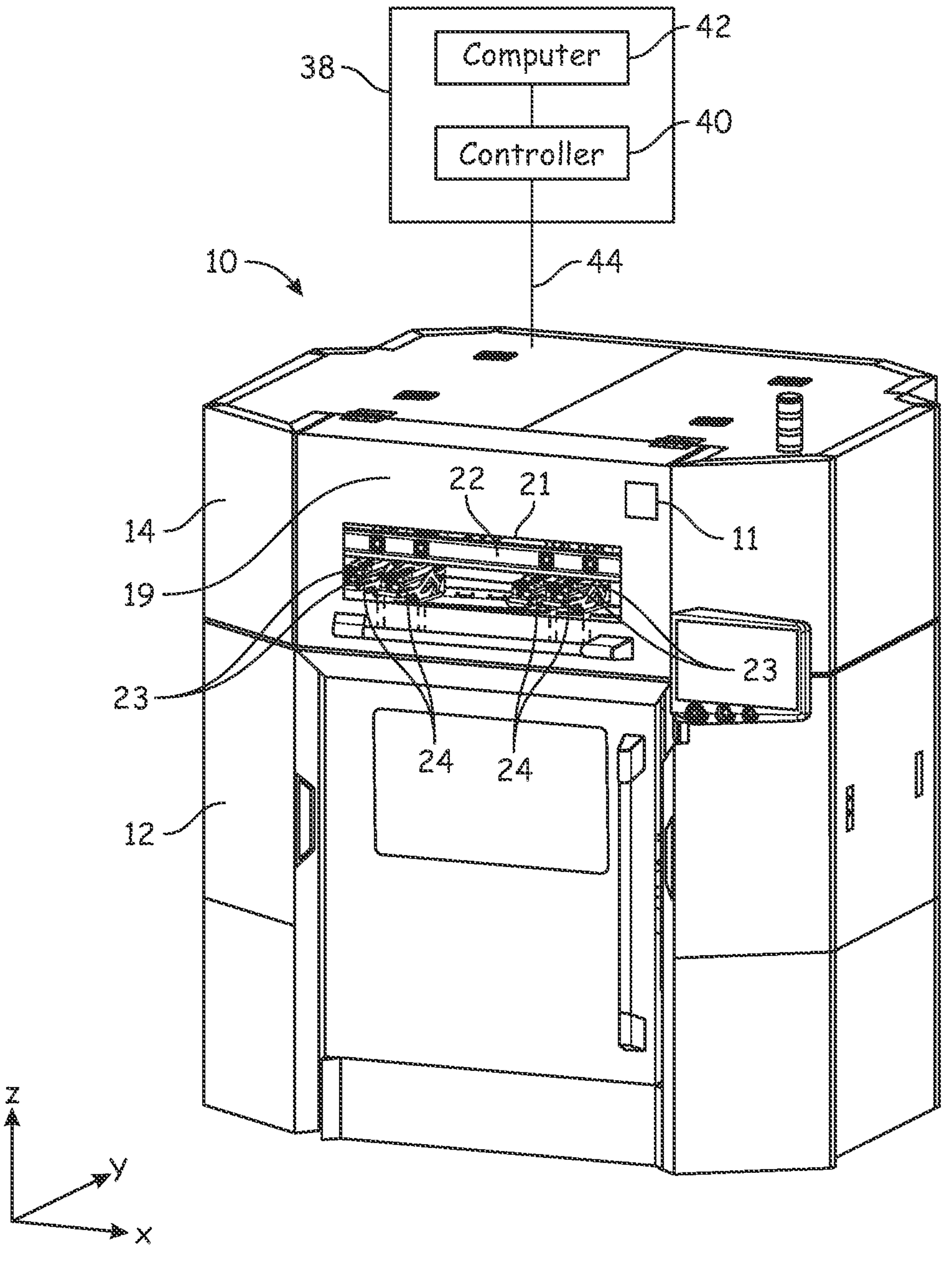
FIG. 1 is a perspective view of an extrusion-based 3D printer of the present disclosure having a heated build chamber positioned below a tool chamber.
Figure 2:
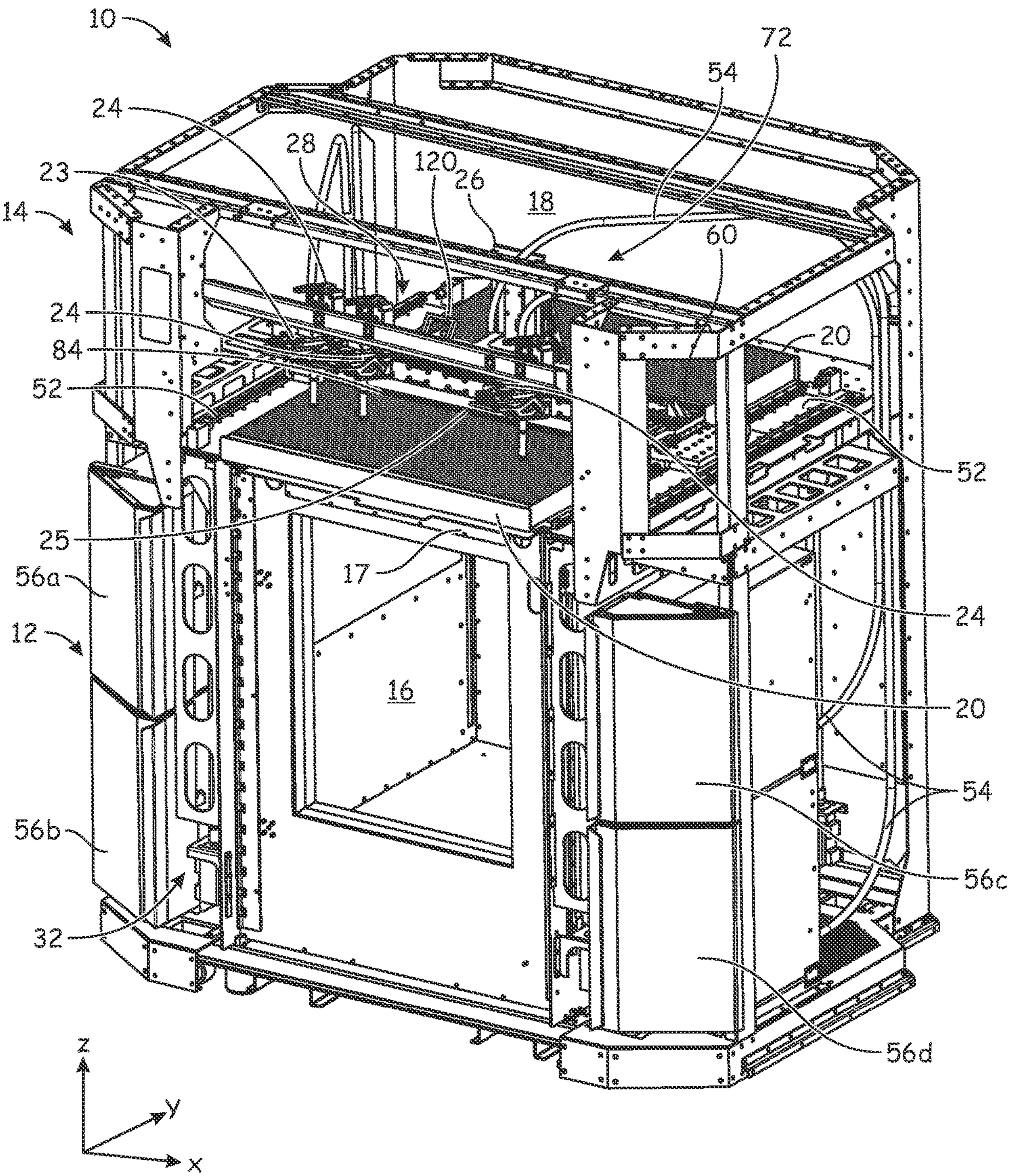
FIG. 2 is a perspective view of portions of the 3D printer shown in FIG. 1, with portions of the frame or cabinet removed to illustrate separation of the build and tool chambers and other features in greater detail.

The present disclosure is directed to a "smart" print head or extruder for use in a 3D printer, wherein the print head includes a signaling or notification system, such as a LED light, that emits light in a color or pattern that is indicative of a status or health of the 3D printer. The operator has access to a key chart that allows the emitted illuminated signal to a sensed status or health issue with the 3D printer. Based upon the viewed illuminated signal and identified status or health, the operator can take the necessary action to correct an error or further diagnose the status of the print head. Utilizing light signals allows the operator to quickly monitor the health and status of one or more printers and possibly operate more 3D printers at one time relative to a 3D printer that does not provide visual status and health indication from the print heads. As used herein, tool, print head and extruder can be used interchangeably. While a LED light system is disclosed, other types of illuminators are within the scope of the present disclosure.

The illuminated signals are visible through windows in the 3D printer and the print heads are accessible through a door in a tool crib/chamber above a heated printing chamber. The tool chamber and the printing chamber are separated by a thermal barrier that keeps the tool chamber cooler than the print chamber. The lower temperature in the tool chamber allows one or more print heads with a sensed issue to be accessed while another print head is inserted into the heated chamber and continues to extrude material to print a part. The one or more print heads with the signaled status and health indicators can be accessed while retained in a print head carriage and/or tool crib, to address the identified status issue with the print head, or the print head can be removed from the print head chamber and be maintained and/or replaced.

Each print head includes a number of sensors that send signals to a controller which in turn sends control signals to a light within the print head indicative of the status or health of the print head or the need for maintenance or replacement. Additionally, sensors in the 3D printer that are external to the print heads can send signals to the control which can send control signals to the light within the print head to indicate the status and/or health of other sensed parameters or conditions within the 3D printer. By way of non-limiting example, the light can emit different illuminated signals that the print head is active and ready for use, that the print head is idle, that the print head is waiting for filament to be loaded, the liquefier is jammed, the liquefier is cold or cooling below a setpoint, that there is a filament drive fault, such as an extrusion axis error that needs attention, the extrusion end has reached end of life, the extruder is ready to load filament because the spool supply is empty, or the extruder is otherwise active on the gantry and no filament detected at the extruder head.

In some embodiments, the light indication of status or printer health can be state independent, meaning that a light indication is for the same matter or issue regardless for the state of the system. By way of nonlimiting example, a flashing red light could always indicate that there is a filament jam in the print head, independent of the state of the print head. In other embodiments, the light indication status can be state dependent and mode specific, meaning depending on the activity of the print head a same light indication can alert to the user to different issues. By way of nonlimiting example, a flashing red light can indicate a filament jam in the print head after a purge attempt, but can also mean the tip requires calibration after a calibration status is requested.

Exemplary sensors within the print head or tool include a temperature sensor in the liquefier portion or hot end of the print head, an optical sensor to detect the presence of the filament, a pressure sensor or strain gauge. Other parameters of the print head, such as estimated useful life can be tabulated by the controller or external sensors can be utilized to determine the positioning of the print head in when carried by the gantry.

While the present disclosure describes an operator monitoring a status and health of a 3D printer, the present disclosure includes other methods and systems. In some embodiments, the 3D printer is monitored and/or controlled independently of an operator. In some embodiments, an operator monitors the 3D printer via visual, audio, text, haptic, other means, alone or in combination with one another. In some embodiments, monitoring the 3D printer combines more than one monitoring methods (e.g., haptically and visually).

The present disclosure may be used with any suitable additive manufacturing system, commonly referred to as a 3D printer. For example, FIGS. 1-5 illustrate a 3D printer 10 having features as discussed above. FIG. 1 is a perspective view of the 3D printer enclosed in cabinets. FIGS. 2-5 are perspective views or side views of the 3D printer with portions removed to illustrate internal features more clearly. As shown initially in FIGS. 1 and 2, 3D printer 10 includes a build chamber cabinet 12 housing a heated build chamber 16 and a tool chamber cabinet 14 housing a separate tool chamber 18, with the tool chamber positioned on top of the build chamber. The tool chamber 18 houses multiple tools, in a tool rack 22, including selectable print heads 24. The tool chamber 18 includes a window 21 in a door 19 through which light is visible through a optically translucent or transparent cover 23 in each print head 24. The 3D printer 10 includes a print head carriage 26 which connects or couples to a selected tool or print head, with an x-y gantry 28 moving the carriage 26 and a selected print head in an x-y plane above a build plane within the heated build chamber 16. The build plane is provided by a platen or platen assembly 30 (shown in FIGS. 4-5) within the build chamber 16, with the platen 30 being moved in a vertical z direction within the build chamber by a platen gantry 32. The unheated tool chamber 18 and heated build chamber 16 are separated by an insulator 20, described below in greater detail, which allows a nozzle 25 of a selected print head 24 to extend from the tool chamber 18 into the heated build chamber 16 such that the build environment can be maintained an elevated temperature while preventing the same elevated temperature in tool chamber 18. Retaining the electronic components of the print head outside of the heated build chamber can extend the life of the print head as typically, the electronic portions of the print heads cannot survive the elevated temperature of the build environment.

The tool chamber 18 includes a window 21 in a door 19 through which a light is visible through an optically translucent or transparent cover 23 in each print head 24. An illuminated status indicator 17, typically a LED, is located in the print head 24 behind the optically translucent or transparent cover 23 that is visible through the window 21 and allows an operator to determine a status of each print head based upon the color and/or frequency of blinking of the light. In the event a print head 24 requires attention, the operator determines the issue based upon the illuminated signal emitted through the optically translucent or transparent cover 23, or while viewing the tool chamber with the door open. The operator can open the door 19 to access the print head 24 with the identified issue, remove the print head 24 from the tool rack 22 and perform maintenance or print head replacement while another print head 24 is printing one or more parts.

In the exemplary embodiment of 3D printer 10, a print head 24 is shown engaged on a tool mount 27 of the carriage and has an inlet 29 for receiving a consumable build material and a nozzle 25 for dispensing the build material onto the platform in a flowable state. The consumable build material can be provided to the print head from one or more filament spools 50 positioned within spool cabinets 56 positioned on the sides of the build chamber, and through filament guide tubes 54 extending from the spool cabinets to the print head.

Figure 6:
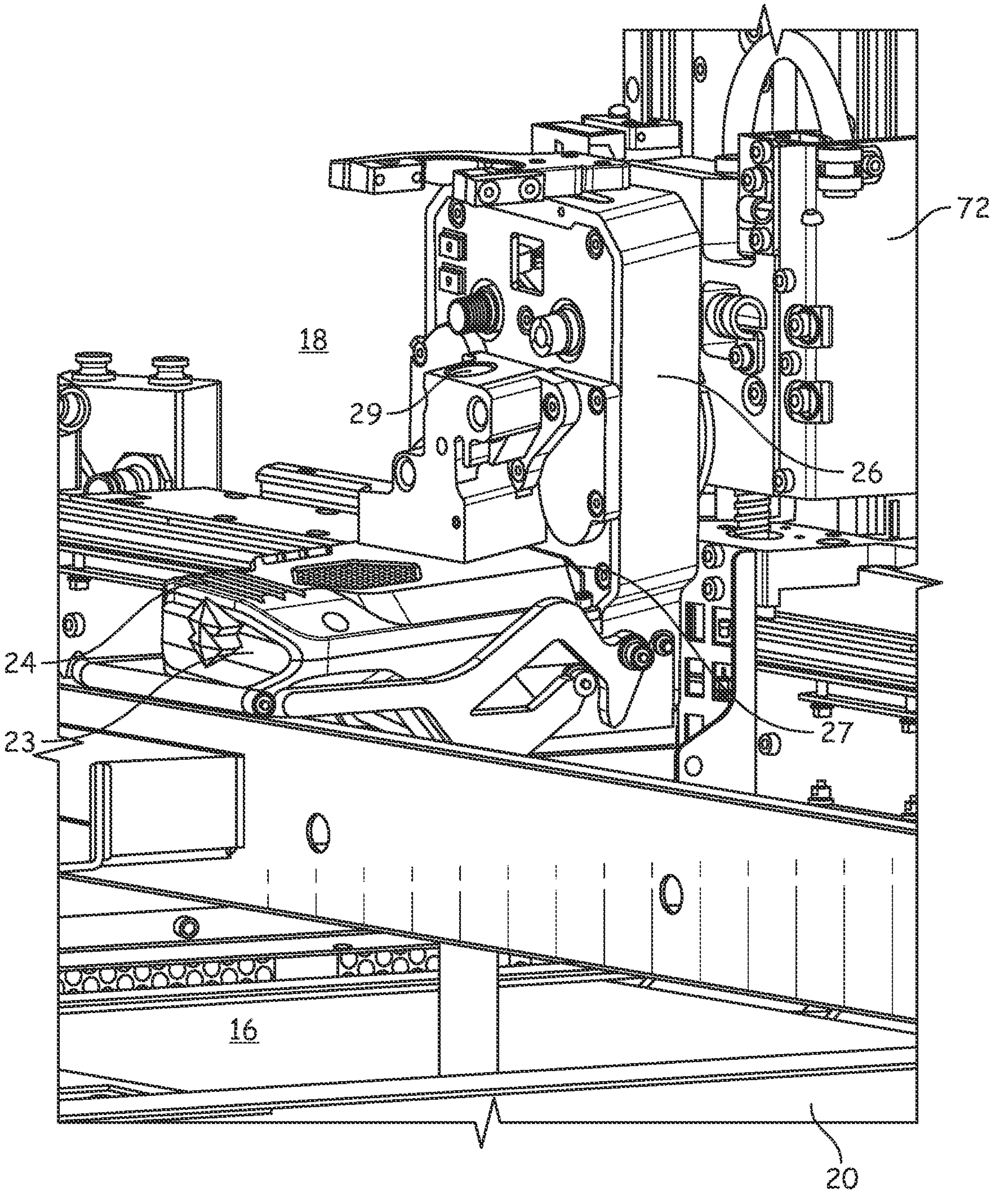
FIG. 6 is a close up view of a print head engaged by a print head carriage on a local Z positioner.
Figure 7:
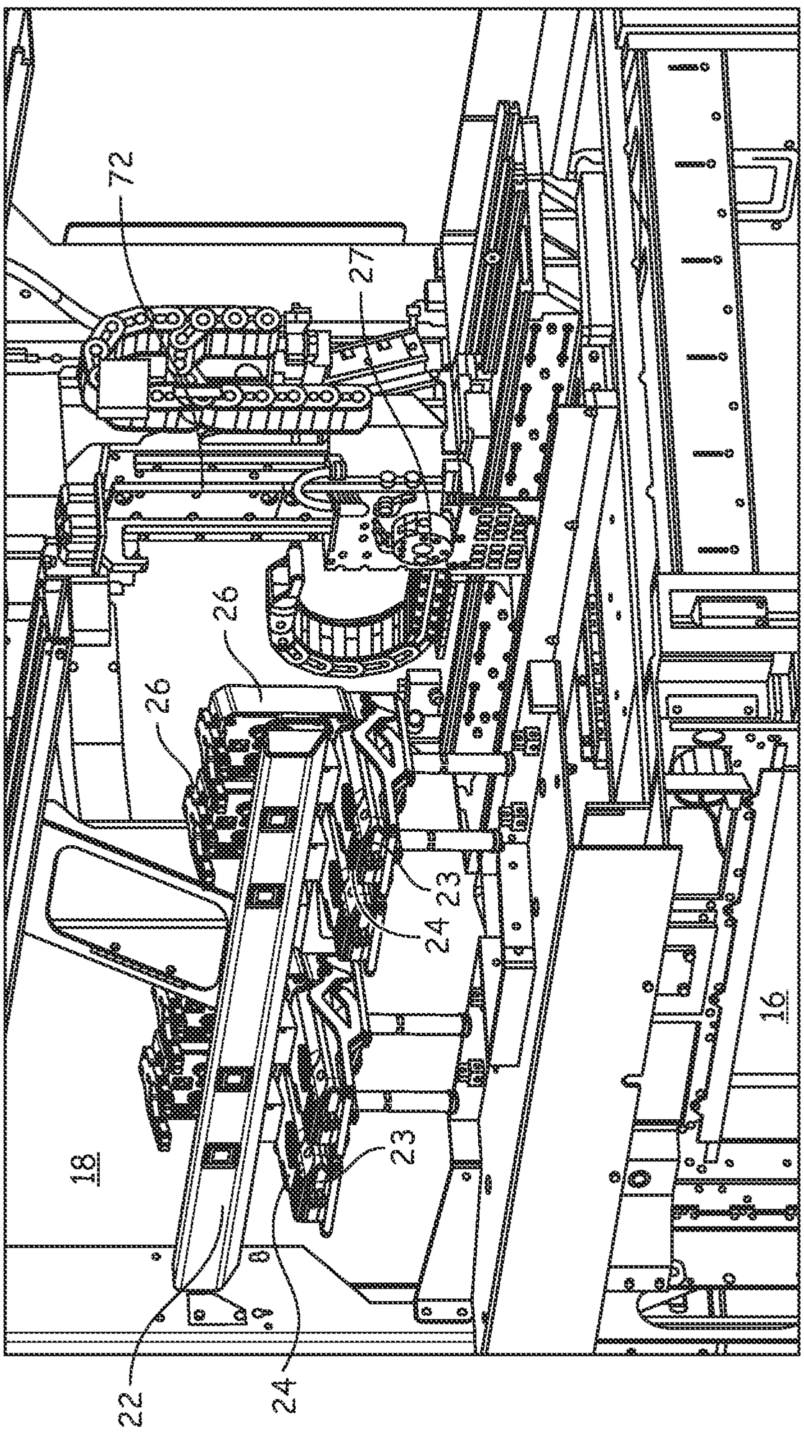
FIG. 7 is a close up view of the print heads retained in a tool rack within the tool chamber.

As shown, the x-y gantry 28 is mounted on top of the build chamber, and in an exemplary embodiment comprises an X-bridge 60, Y-rails 52, and associated X and Y motors for moving and positioning the carriage 26 (and any build tool installed on the carriage) in an x-y plane above the build plane. The carriage is supported on the X-bridge and includes a mount 27 for receiving and retaining print heads and a local Z positioner 72 for controllably moving a retained print head out of the x-y build plane along a perpendicular z direction axis (e.g., not in a pivoting manner). The local Z positioner operates to move a retained print head in a limited Z band of motion from a build position within the heated build chamber (as illustrated in FIG. 6 wherein the translucent cover 23 in the print head 24 is viewable through the window 21), to a tool change position in a tool rack (as illustrated in FIG. 7 wherein the translucent cover 23 in the print head 24 is viewable through the window 21); in some embodiments, the local z positioner 72 may be utilized while the carriage is moving in x-y or when it is in a fixed x-y position. The x-y gantry, as well as the local Z positioner, can utilize any suitable motors, actuators or systems to move the carriage and print head in the x, y and z directions as discussed.

Tool rack 22 is located above the build chamber at a position reachable by the tool mount 27 when elevated by the local Z positioner 72 where the translucent covers 23 are visible through the window 21. The tool mount may engage with and support a print head, and is used to retain and swap print heads provided in the rack, and once put into service the hot end with the nozzle is positioned into the heated print chamber. In general, any modular tools, such as print heads or any other tools (generally and collectively referred to below simply as “tools”) that are removably and replaceably connectable to a 3D printer may be stored in bins of a tool rack for managing tool inventory and interchanging tools during operation of the 3D printer. The local Z positioner 72 is utilized for picking and placing tools in the bins so that the 3D printer can interchangeably use the various modular tools contained in the tool rack. The tool rack may be any suitable combination of containers or other defined spaces for receiving and storing tools.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print head 24, filament drive mechanisms, chamber 16 (e.g., with a heating unit for chamber 16), head carriage 26, motors for platen gantry 32 and x-y or head gantry 28, motors for local Z positioner 72, and various sensors, calibration devices, display devices, and/or user input devices. In some embodiments, controller assembly 38 may also communicate with one or more of platen assembly 30, platen gantry 32, x-y or head gantry 28, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen assembly 30 to a predetermined z height within chamber 168. Controller assembly 38 may then direct x-y gantry 28 to move head carriage 26 (and the retained print head 24) around in the horizontal x-y plane above chamber 16, and direct the local Z positioner 72 to move the head carriage in the z direction relative to the x-y plane, in addition to the platen gantry z movement. Controller assembly 38 may also direct a retained print head 24 to selectively advance successive segments of the consumable filaments from consumable spools 50 through guide tubes 54 and into the print head 24. It should be noted that movements commanded by the controller assembly 38 may be directed serially or in parallel. That is, the print head 24 can be controlled to move along the x, y and z axes by simultaneous directing the x-y gantry 28 and the local Z positioner 72 to re-position the head carriage 26 along each axis.

Figure 4:
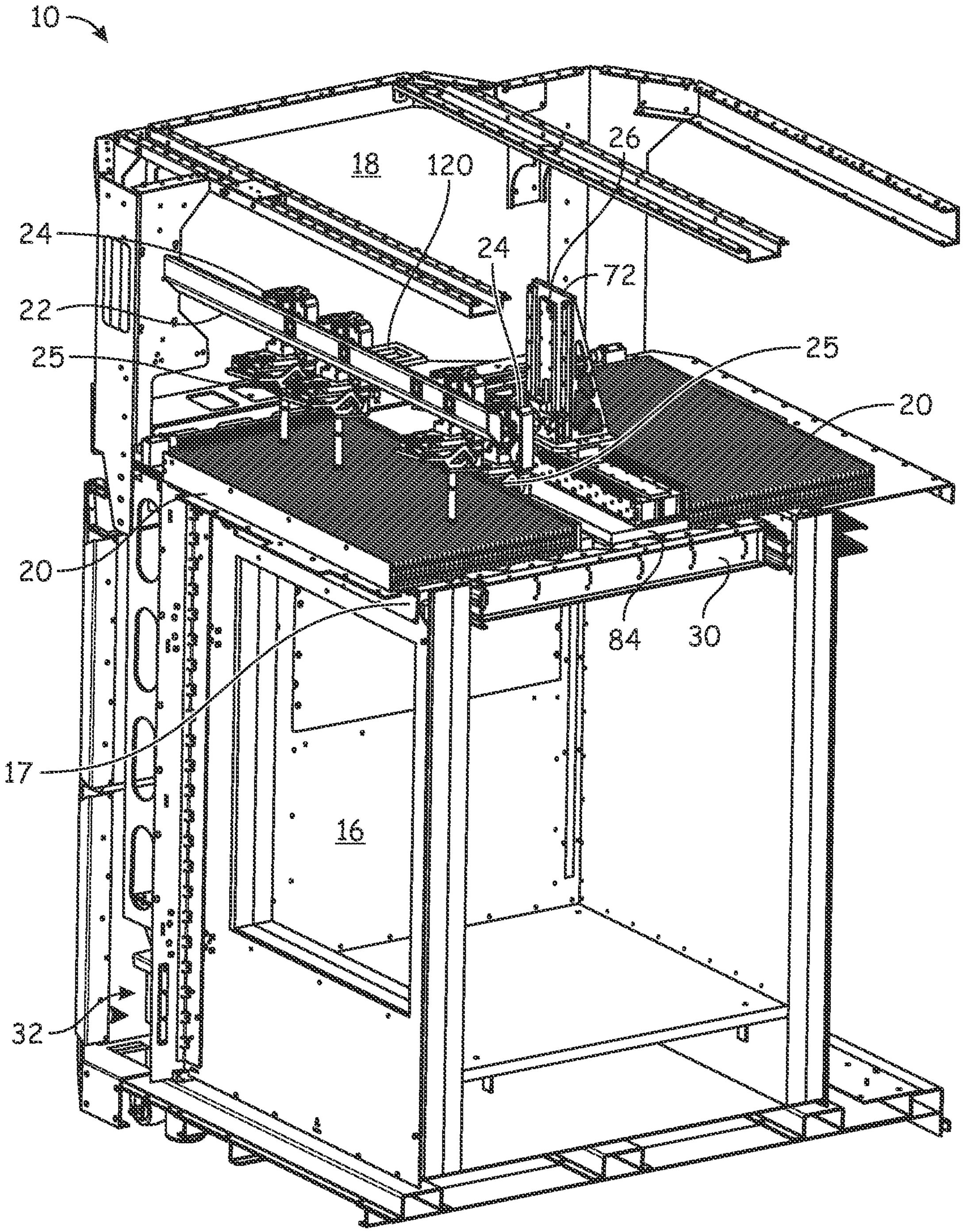
Figure 5:
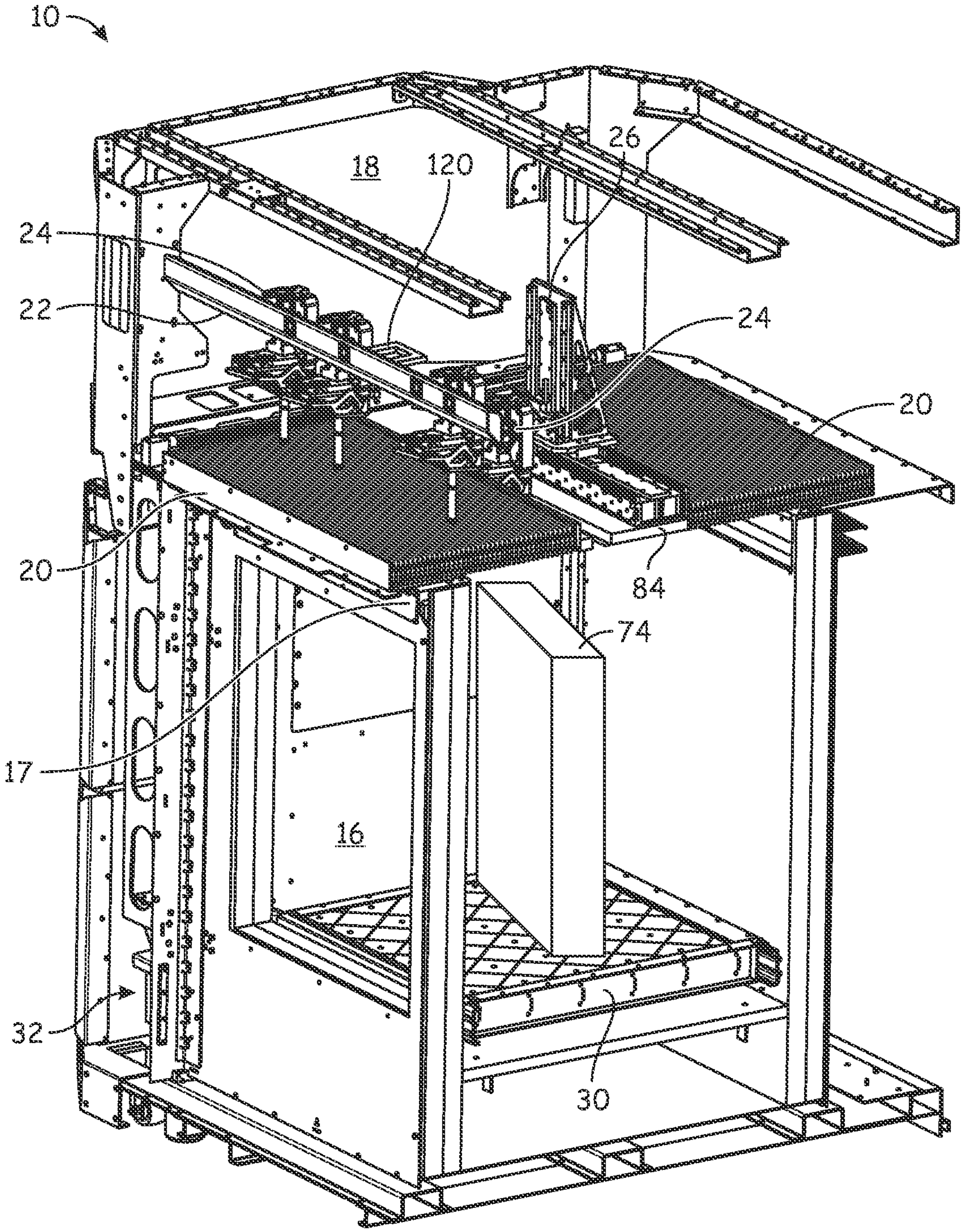

At the start of a build process, the build plane is typically at a top surface of the build platform or platen 30 (or a top surface of a build substrate mounted to the platen) as shown in FIG. 4, where the build platform is positioned to receive an extruded material from the nozzle 25 of the print head. The start of a build process begins with the platen 30 proximate a top region of the build chamber. As layers are built, the platen is indexed away from the build plane, allowing printing of a next layer in the build plane. The platen gantry 32, or primary Z positioner, moves the build platform away from the print plane in between the printing of layers of a 3D fabricated part 74 (shown in FIG. 5). One or more parts and associated support structures can be printed in a layer-by-layer manner by incrementally lowering the platen in the z direction. FIG. 5 illustrates portions of 3D printer 10 with the platen 30 at a lowered position, achieved through numerous incremental z direction repositioning steps while printing.

As discussed, the build chamber 16 of the 3D printer may be heated to providing a heated or ovenized build environment, such as in the case of FDM® 3D printers manufactured and sold by Stratasys, Inc. of Eden Prairie, MN. The heated build chamber is provided to mitigate thermal stresses, or to anneal the part, and other difficulties that arise from the thermal expansion and contraction of layered build materials during fabrication of a layered part, using methods such as are disclosed in U.S. Pat. No. 5,866,058. The insulator 20 shown in FIGS. 2-5 can be a deformable thermal insulator which allows the x-y gantry to move the head carriage 26 and attached print head 24 to move in the x-y plane. An example of a deformable thermal insulator 20 which allows the x-y plane movement is disclosed in Stratasys U.S. Pat. No. 7,297,304. A bellows tray 84 or similar mechanism is provided between sections of the deformable insulator to provide access for the nozzle 25 of the print head into the heated build chamber while aiding in insulating the build chamber from the tool chamber. The bellows tray 84 moves in the y-direction as the x-y gantry 28 moves the head carriage, and the sections of deformable thermal insulator 20 on either side of the bellows tray move or deform accordingly to maintain the thermal insulation between chambers.

Figure 8:
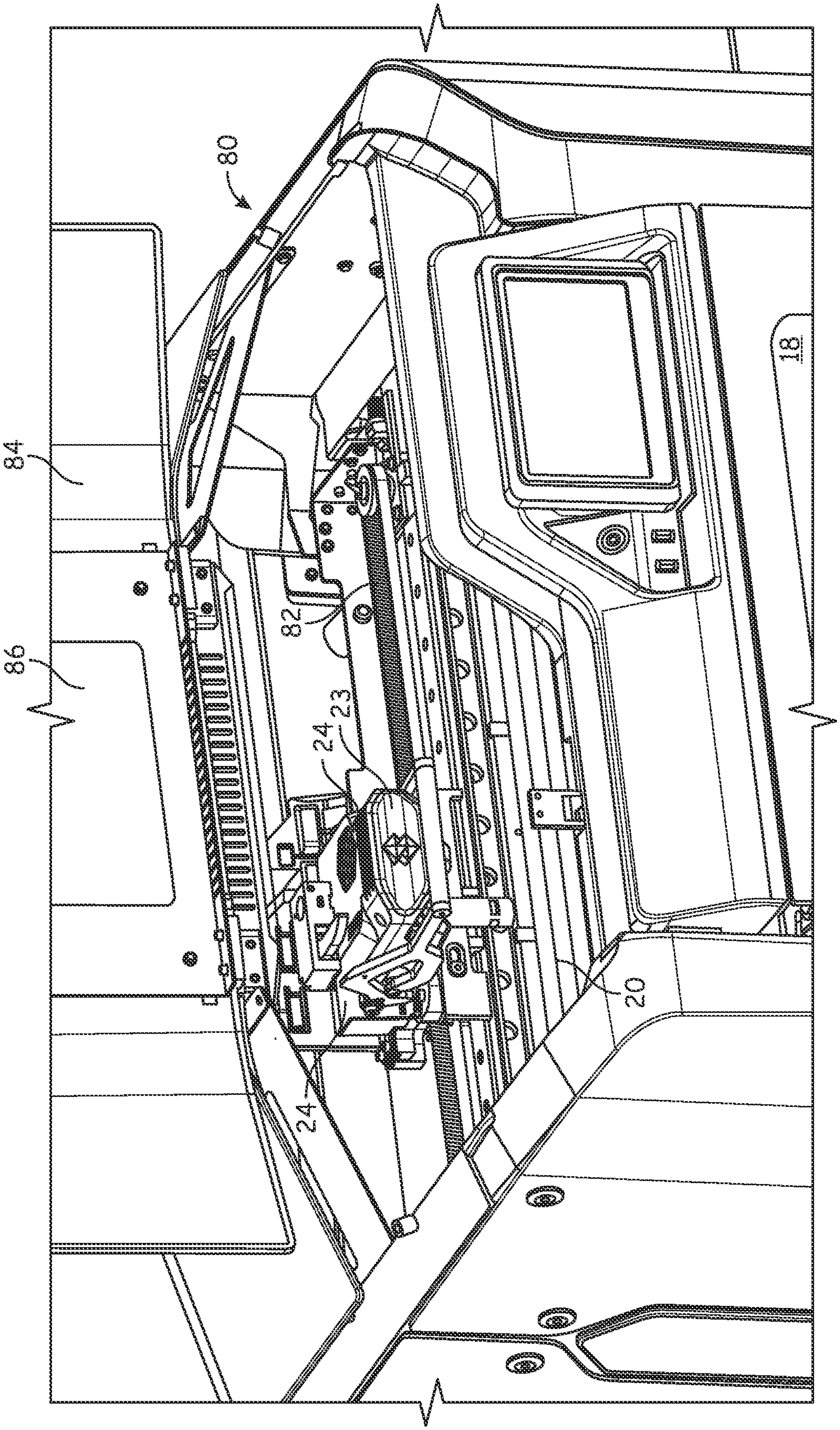
FIG. 8 is a view of the print head in a 3D printer where the print head moves in the x-y plane and a platen moves in a z direction.

Referring to FIG. 8, the disclosed health and status monitoring system of the present disclosure can also be used in a typical extrusion-based 3D printer 80. The 3D printer 80 includes the print head 24 with the optically transparent or translucent cover 23 that is retained to a print head carriage 26 that is carried and moved by a x-y gantry 82 with a platen (not shown) moves in the z direction to print the part. The electric components of the print head 24 are located above the thermal barrier 20 that retains heat within a heated build chamber 16. The 3D printer 80 includes a hinged cover 84 that includes a window 86 that allows the status and health of the 3D printer 80 to be monitored as the part is printed.

Figure 3:
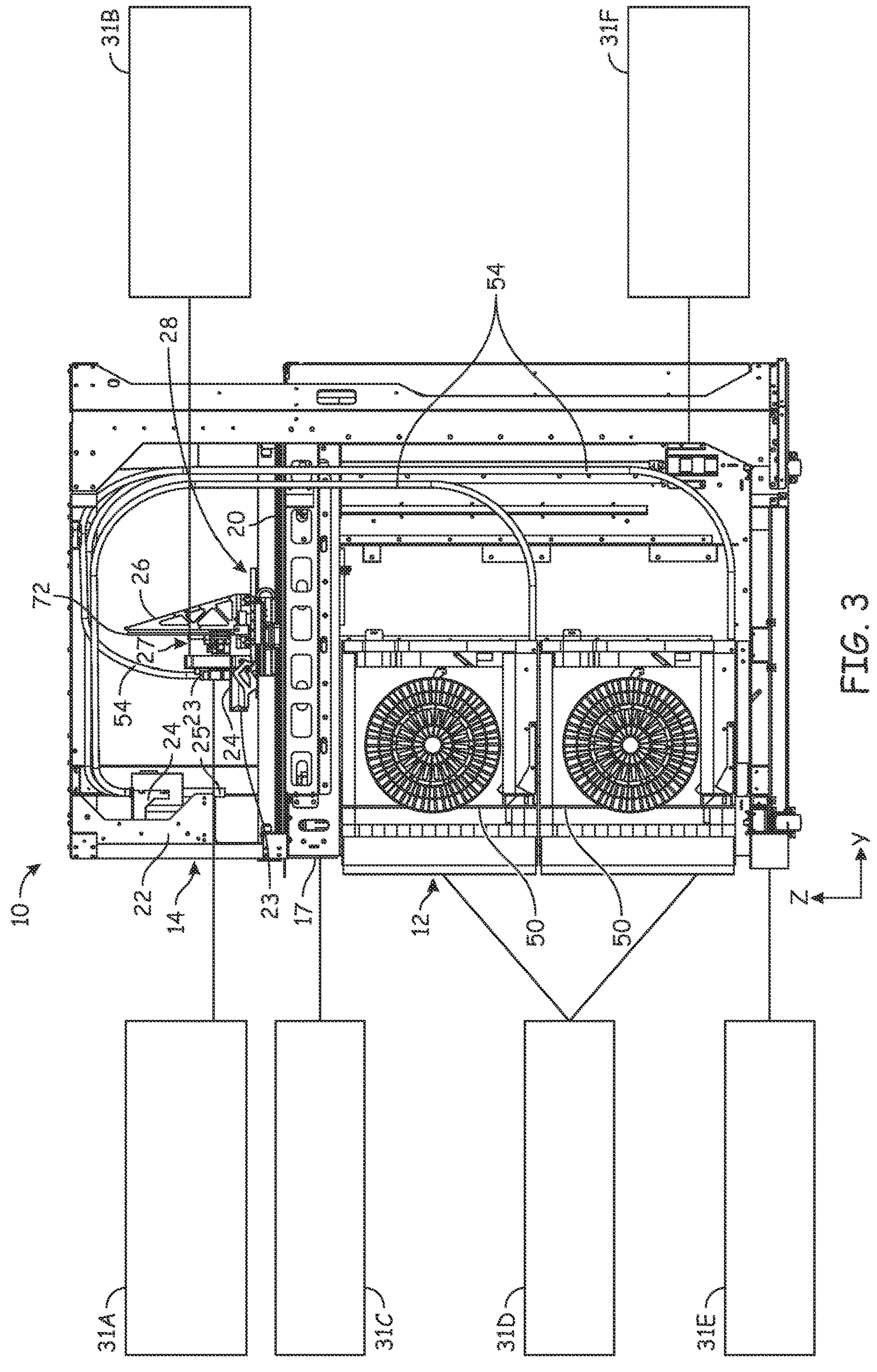
FIGS. 3-5 are views of the 3D printer shown in FIG. 1, illustrating filament spool cabinets, x-y gantry and local Z positioner features, and an insulator separating the build and tool chambers.

Referring specifically to FIG. 3, locations of the sensors within the 3D printer 10 used to monitor the status and health of the 3D printer 10 are illustrated. The sensors send signals to the controller 40, which in turn sends signals to the print head 24 such that a light is illuminated and visible through a transparent or translucent cover in the print head that is indicative of the status and/or health of the 3D printer 10. The sensors include print head sensors 31A which include a load cell to determine the force of the filament within the liquefier (U.S. Pat. Nos. 9,168,689 and 10,556,381), a drive motor sensor such as ammeters and volt meters (U.S. Pat. No. 8,157,202), filament detection and drive sensors (U.S. Pat. No. 8,157,202), temperature sensors (U.S. Pat. No. 9,022,769) and a cooling fan tachometer. The sensors include a print head engagement sensor 31B that senses the attachment of the print head 24 to the print head carriage. A print head calibration sensor 31C (U.S. patent application Ser. Nos. 17/562,377 and 17/562,354) is located within a separate chamber from the heated build chamber 16 and the tool chamber 22. Filament EEPROM 31D (U.S. patent application Ser. Nos. 17/859,446 and 17/859,465) located proximate the spool cabinets 56 and provides information regarding type of material on the spool and the amount of filament remaining on the spool. Filament drive motor sensors 31E, such as a volt meter or an ammeter, is sends signals regarding the performance of the motors to the controller. Sensors for a filament accumulator (U.S. Pat. No. 11,485,085) in the filament feed path for each filament supply are illustrated at 31F. The same or similar sensors can be utilized in the printer 80.

Figure 9:
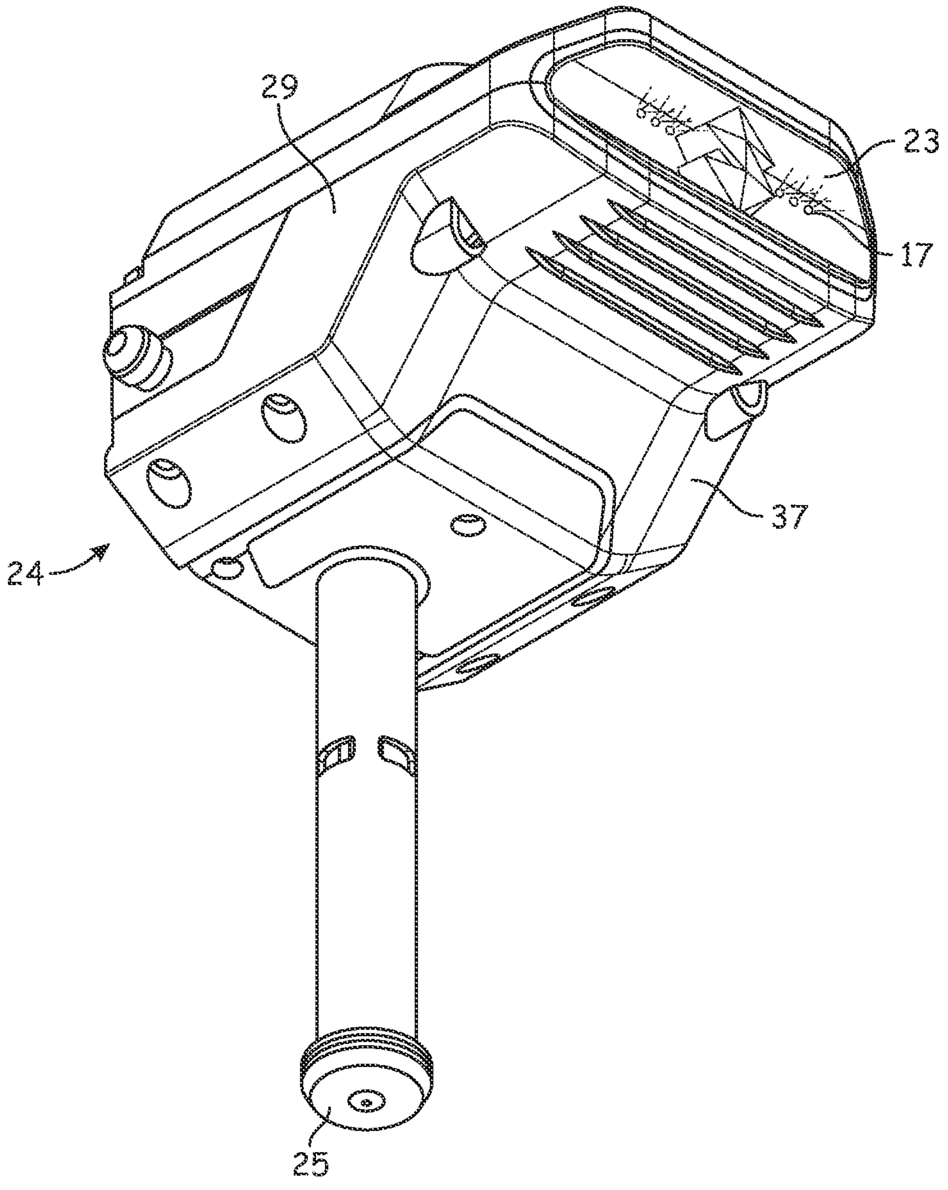
FIG. 9 is a projection view of an extruder with an illuminated status indicator.
Figure 10:
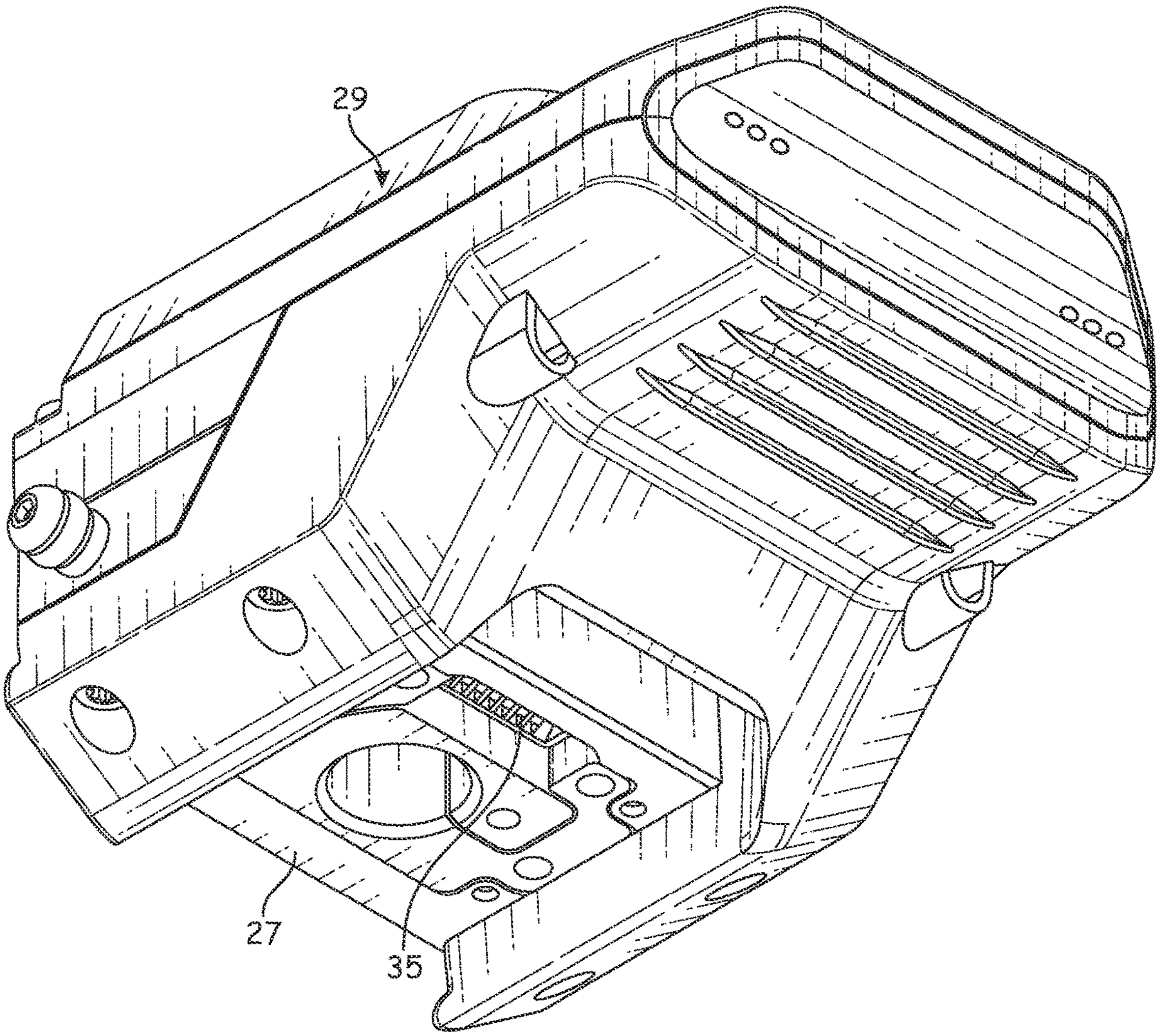
FIG. 10 is a projection view of a drive portion of the extruder with the illuminated status indicator.
Figure 11:
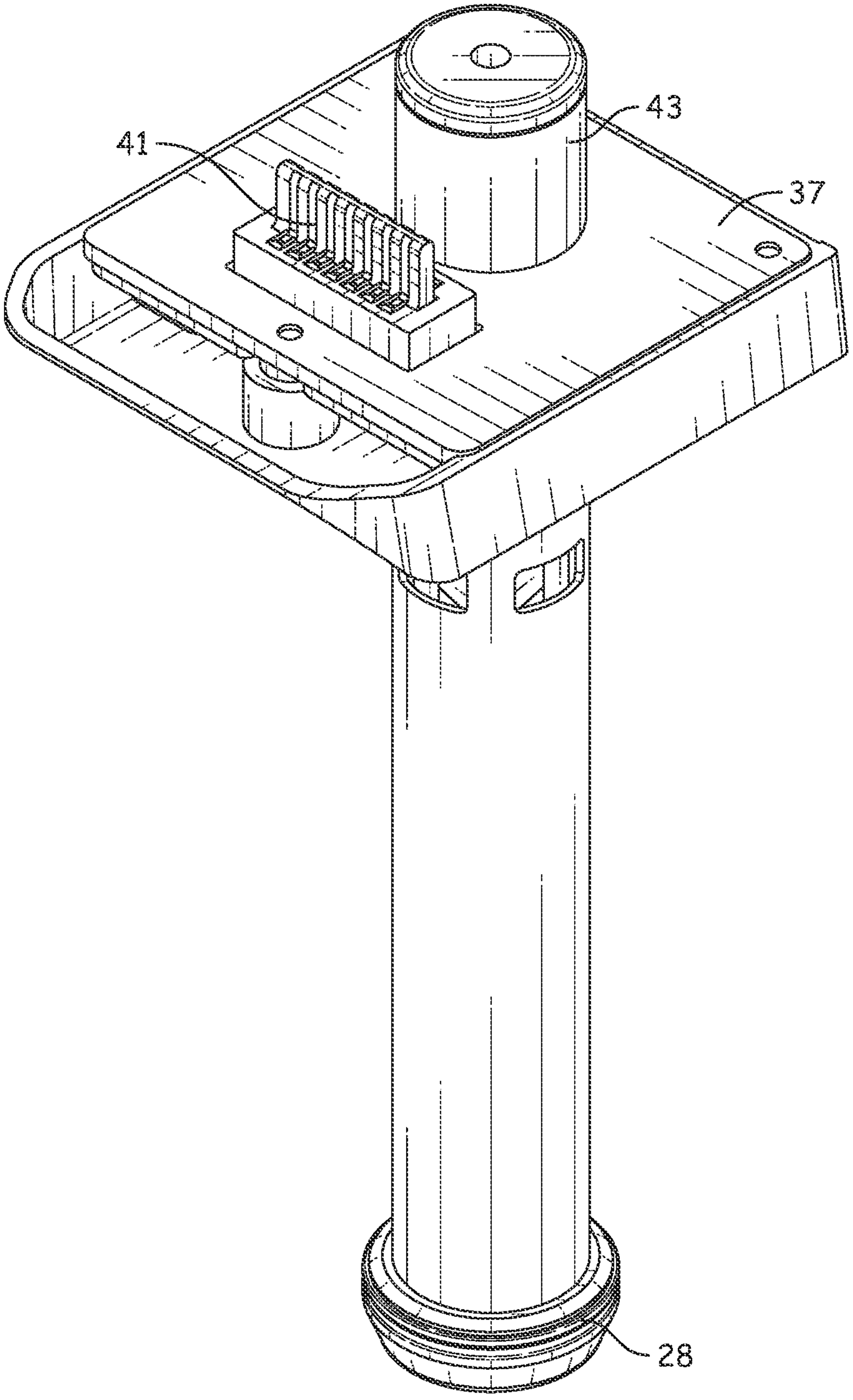
FIG. 11 is a projection view of the liquefier portion of the extruder.

Referring to FIGS. 9-11, an exemplary, nonlimiting print head 24 is illustrated. The print head 24 includes the optically transparent or translucent cover 23 that is positioned to emit light from the illuminated status indicator 17, typically a light emitting diode such as a red/green/blue LEDs, therethrough. The illuminated status indicator 17, such as the red/green/blue LEDs, can be controlled to emit different wavelengths of color that span the visible light spectrum and/or frequency of intensity and/or blinking of the wavelengths of color that span the visible light spectrum to indicate the status of the print head 24. In some embodiments, the 3D printer 10 includes a key 11 (as illustrated in FIG. 1) that correlates the type of light emitted to a status or error in each of the print heads 24. The print head 24 includes a filament drive and a heated liquefier tube that creates a molten pool in the liquefier tube. When filament is driven into the molten pool, molten material is extruded through the nozzle 25 to print a part or associated support structure.

The print head 24 includes a drive portion 29 that includes the illuminated status indicator 17 and the optically transparent or translucent cover 23. The drive portion includes an electric coupler proximate a back edge 27 that engages a complimentary coupler on the print head carriage 26. The drive portion 29 include a receptacle 35 for connecting to electrical components in a liquefier portion 37 through plug 41. The liquefier portion 37 includes a liquefier tube 43 that is configured to accept, heat and extrude molten material through the nozzle 25.

By way of non-limiting example, a color scheme with steady, pulsing or flashing lights can be utilized that utilizes positive indicating colors and cautionary or trouble indicating colors. Positive indicator colors include a first group of colors, such as but not limited to, blue, white and green, provide positive feedback where the printer is operating normally. The emitted indicator lights can be either steady, pulsing or flashing to indicate that the print head is operating normally.

Cautionary or trouble indicator colors include a second group of colors, such as but not limited to, yellow, amber, orange and red, provide cautionary feedback that issues may, end of life of the print head is approaching or a failure occurred that requires immediate attention. By way of non-limiting example yellow, amber and orange colors can be utilized to provide "cautionary" indication, allowing for continued printing or other processes if appropriate, but indicating that a replacement or end-of-life are approaching. In contrast, red would indicate a failure of some type requiring intervention to move forward with that tool or process.

In the disclosed color scheme, a steady on light indicates a state that doesn't require immediate user intervention, typically a status whether positive/normal operation or cautionary or trouble. A fast flashing indicates immediate operator action such as, by way of non-limiting example, to load filament or remove head. A slow pulsing indicates a machine transitioning state such as, by way of non-limiting example, machine material filament loading and unloading.

In other instances, the color indication scheme can include transitions from a positive color scheme to a cautionary color scheme. By way of non-limiting example, a fast-flashing blue or white light informs the operator that the machine is ready and waiting for the operator to load filament. If an operator ins't able to respond right away, the emitted light changes to a steady amber to call their attention to the need without having lights continually flashing on the factory floor for a non-urgent matter. Additionally, in process that can take a longer period of time, such as when filament is loaded or unloaded from a print head, a slow light pulse indicates that the loading or unloading process is occurring.

In another scenario, if a print head is clogged, the light could blink amber or orange for a period of time. If action is not taken during the allotted time, the light will become a steady amber or orange indicating that immediate action is required. In another scenario, if the filament supply is beginning to run low a blinking amber or orange light will be emitted until the filament supply is very low or empty, at which time the light becomes a steady amber or orange. The disclosed scenarios show nonlimiting situations where the emitted light changes from a blinking light, indicative of attention being required, to a steady emitted signal, indicating that immediate attention is required.

In some instances, the key 11 can provide the operator with the meaning of the emitted light signal from the print head. In other instances, the signal can have multiple meanings where the control screen provides the meaning of the emitted light signal.

Figure 12:
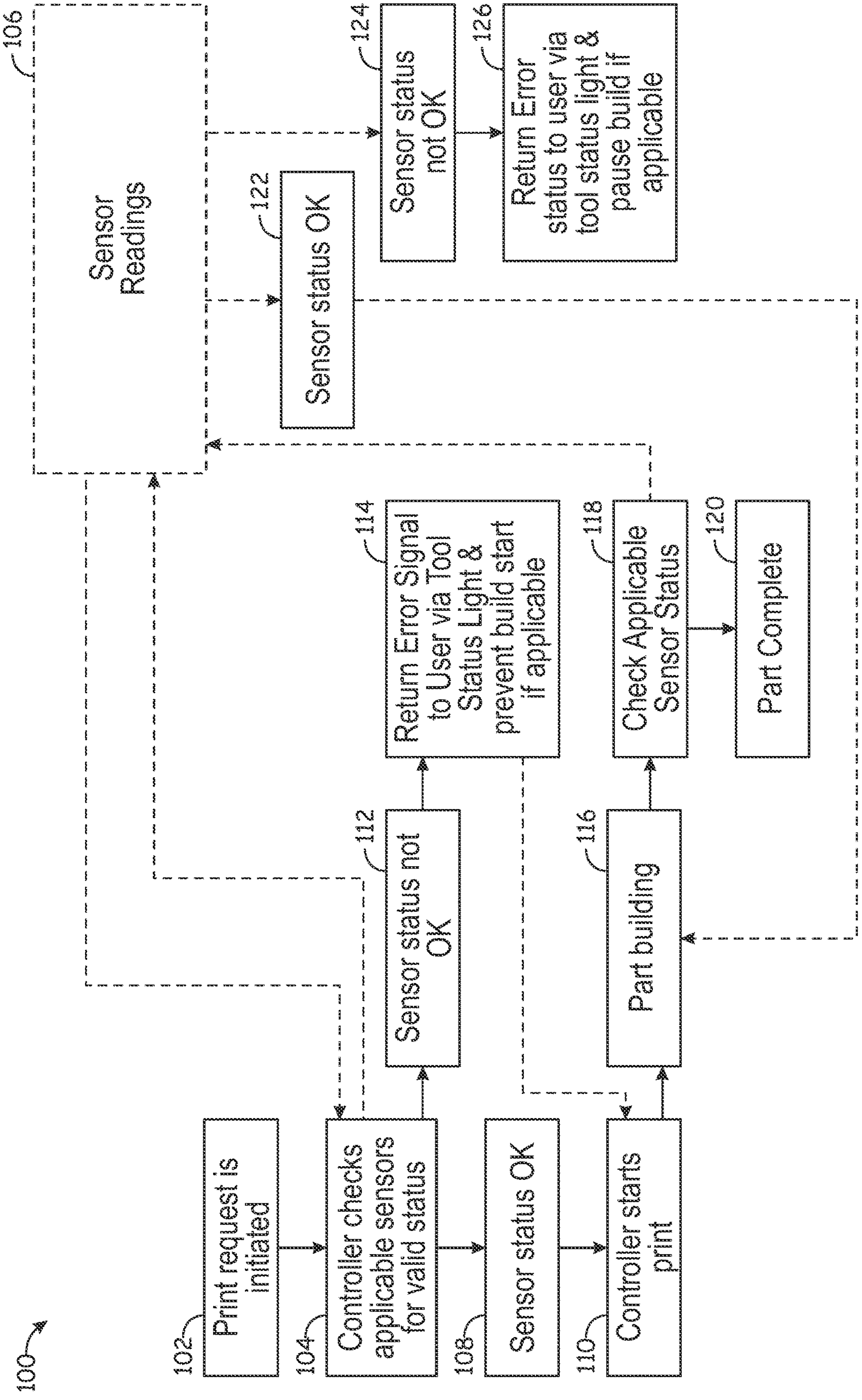
FIG. 12 is a flow chart of using sensed parameters to begin and complete a print job.

A flow chart illustrating the preprinting diagnostic logic and the diagnostic logic used during the printing process is illustrated in FIG. 12 at 100. A print request is initiated at step 102 which causes the preprinting diagnostic check to be initiated at step 104 where the controller checks the applicable sensors in step 106. Exemplary, non-limiting sensors that are analyzed include the extruder load cell, extruder drive motor current sensor, extruder drive motor encoder, extruder drive motor EEPROM, extruder drive fan tachometer, liquefier heater power, liquefier heater thermocouples, hot end EEPROM, tool base accelerometer, accumulator switches, filament bay drive motor current, filament bay drive motor encoder, filament bay drive motor EEPROM, filament bay filament detection switches and finally the controller command to print the part, as disclosed above and schematically illustrated in FIG. 3.

When the sensor statuses are determined to be within acceptable operational limits at step 108, the controller then initiates the printing process at step 110. When the sensor statuses are determined to be outside the acceptable operational limits at step 112, an error signal is returned to the user via the user status lights at step 114 until the error is remedied. Once the error is remedied at step 114, the controller then initiates the printing process at step 110. The steps 102, 104, 106, 108, 112 and 114 are included in the preprinting diagnostic logic.

Once the controller initiates the printing process at step 110, the 3D printer begins printing the part at step 116. Once the print step is initiated at step 116, the diagnostic logic is then utilized through the printing process. The diagnostic logic includes the step of checking the applicable sensor status at step 118. The step 118 communicates with the sensor block at step 106. If the sensors are determined to be within the operating range at step 122, the printing process continues at step 116 until the part is completed at step 120.

If the step of checking the applicable sensor status 118 in communication with the sensor readings at step 106 results in a determination that the one or more sensors readings is outside of operational parameters at step 124, an error signal is emitted from the print had at step 126. At step 126, the operator then determines whether to continue or pause the printing process based upon the emitted light signal.

Figure 13:
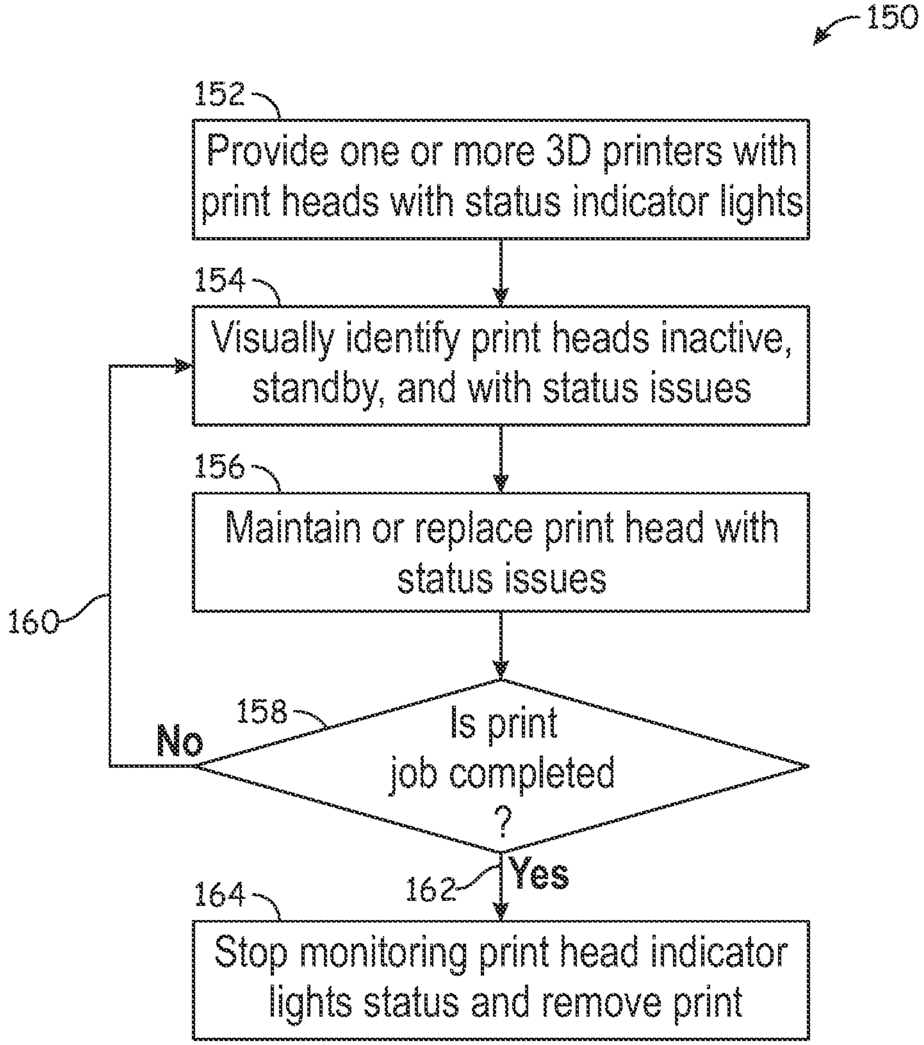
FIG. 13*a* flow chart of using illuminated status indicators on print heads to complete a print job.

Referring to FIG. 13, an exemplary, non-limiting method using the illuminated status indicators on the print heads in a 3D printer is illustrated at 150. The method includes providing one or more 3D printers with print heads with illuminated status indicators at step 152. At step 154, an operator visually identifies printheads that are active, on standby and/or having a status issue based upon the illuminated signal emitted from the print heads. At step 156, the operator maintains or replaces the print heads with the status issues based upon the illuminated signals. At step 158, the operator determines whether the print job is completed. If the print job is not completed, the operator returns at arrow 160 to the visual identification at step 154 and the process 150 continues to repeat until an indication that the print job is complete at arrow 162. With the print job completed, the operator stops monitoring the print head indicator lights and removes the part from the 3D printer at step 164.

Figure 14:
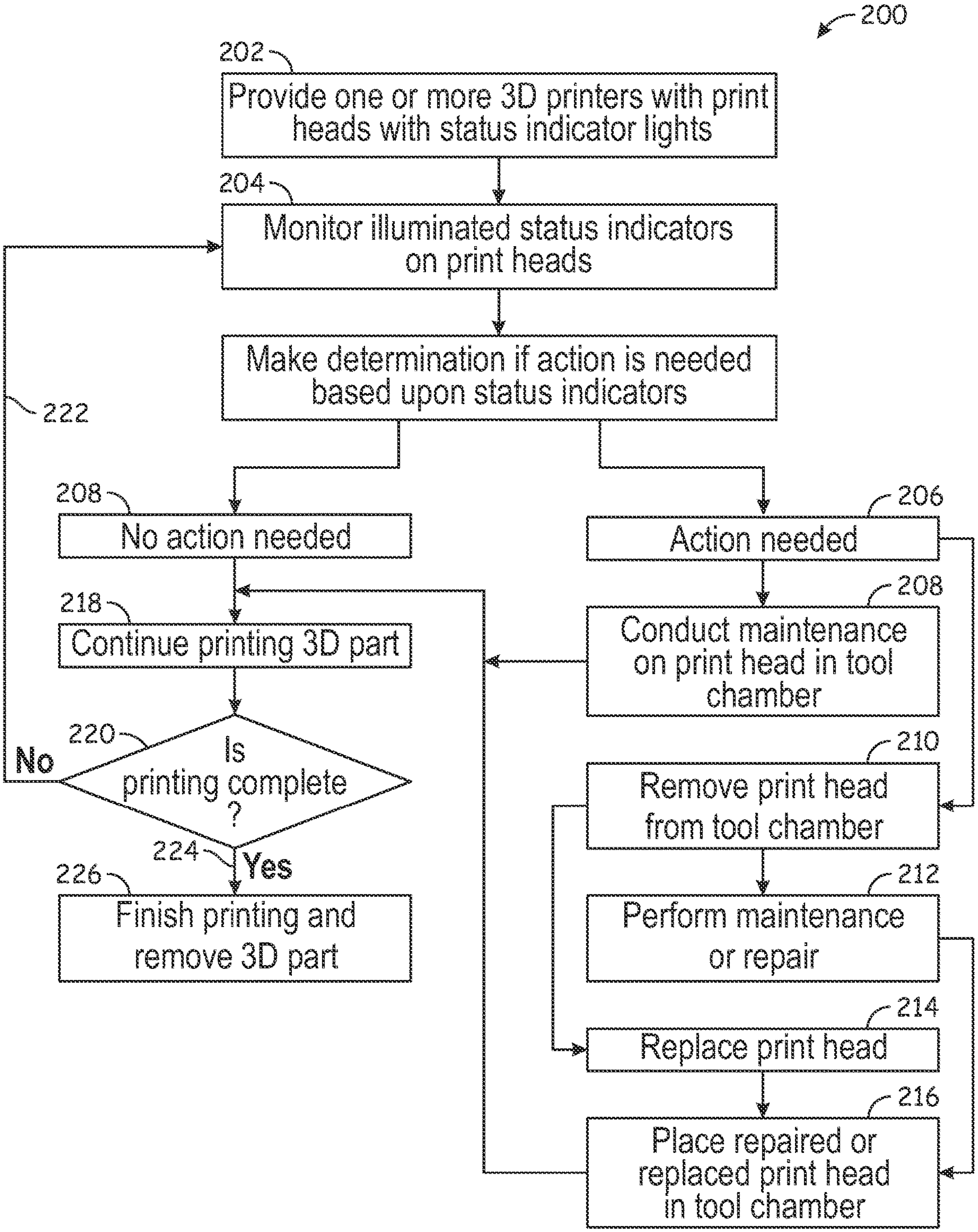
FIG. 14 is flow chart using illuminated status indicators on print heads to repair, maintain or replace a print head while the print job is ongoing.

Referring to FIG. 14, another exemplary, non-limiting method using the illuminated status indicators on the print heads in a 3D printer is illustrated at 200. The method 200 includes providing one or more 3D printers with print heads with illuminated status indicators at step 202. At step 204, a human operator monitors the illuminated status indicators on the print heads. A decision is made whether action is required, or what type of action is required, based on the signal display type indicated. At step 206, a decision is made that human intervention or action is needed, and at step 208*a* decision is made that no action is needed. In some embodiments, at step 206, a maintaining step includes identifying a print head of the plurality of print heads as requiring attention based upon the emitted signals and locating the identified print head in the tool rack. When the operator determines that action is needed at step 206, the operator then determines whether maintenance can be conducted on the print head while in the tool chamber at step 208 or if the print head is needed to be removed from the tool chamber at 210. If the determination by the operator is made that the maintenance or repairs can be completed with the print head in the tool chamber at step 208, the repairs or maintenance are conducted on the print head(s). In some embodiments, for example, a maintaining step includes maintaining or repairing the identified print head, while the identified printed head remains in the tool rack. If the decision by the operator is made at step 210 to remove the print head, once the print head is removed, a decision is made to conduct maintenance or repair at step 212 or to replace some or all of the components of the print head at step 214. Once the print head has maintenance or repair conducted at step 212 or is swapped out at step 214, the print head is returned to the tool chamber at step 216. In some embodiments, a maintaining step includes: removing the identified print head of the plurality of print heads from the tool rack; repairing, maintaining or replacing the removed print head; and returning the repaired, maintained or replaced print head to the tool rack. Whether the repair or maintenance is performed with the print head retained in the tool rack at step 208 or is put back in service at step 216, the printing continues at step 218.

In some embodiment, the operator of the present disclosure is not a human. In some embodiments, the operator of the present disclosure is a device, e.g., a robot. In some embodiments, the operator of the present disclosure can be a plurality of operators, e.g., plurality of humans, plurality of devices, or a combination of human(s) and device(s).

Once it is determined that the printing is compete at step 220, the operator can cease monitoring the status of the print heads. If the print job is not completed, the operator returns at arrow 202 to the monitoring the illuminated status of the print heads at step 204 and the process 200 continues to repeat until an indication that the print job is complete at arrow 224. Once the print job is completed, the operator can stop monitoring the print head indicator lights and removes the part from the 3D printer at step 226.

Although the present disclosure may have been described with reference to preferred embodiments, workers skilled in the art will recognize that changes may be made in form and detail without departing from the spirit and scope of the disclosure.

The invention claimed is:

1. A 3D printer comprising:

a chamber configured to receive extruded material to print a part;

a substantially enclosed tool chamber above the chamber, the substantially enclosed tool chamber comprising a viewing window and a tool rack therein;

a plurality of print heads, each of the plurality of the print heads residing in a docked position on the tool rack and when not in use and configured to receive a thermoplastic-based filament, melt the filament, and deposit the melted filament to form the part, each of the plurality of print heads comprising an illuminated status indicator configured to emit a plurality of signals indicative of a status or error of the print head of the plurality of print heads or a status of the 3D printer, wherein the illuminated status indicator faces the viewing window;

a plurality of sensors located on the print head of the plurality of print heads or in the 3D printer and configured to detect a status of the print head of the plurality of print heads or other printer components or an error in the print head of the plurality of print heads or other printer components; and a controller configured to receive an output from at least one of the plurality of sensors and transmit a control signal to at least one print head of the plurality of print heads that causes the illuminated status indicator to emit a colored signal indicative of the detected status or error;

wherein the signal of the plurality of signals emitted by the illuminated status indicator communicates the detected status or a detected error through color, pulsing frequency, or both.

2. The 3D printer of claim 1, wherein the illuminated status indicator comprises a light emitting diode.

3. The 3D printer of claim 2, wherein the light emitting diode comprises a red/blue/green light emitting diode.

4. The 3D printer of claim 1, wherein each of the plurality of print heads comprises an optically transparent or translucent cover positioned in proximity to the illuminated status indicator such that the emitted signals are visible through the optically transparent or translucent cover.

5. The 3D printer of claim 1, where the plurality of sensors comprises a extruder load cell, an extruder drive motor current sensor, an extruder drive motor encoder, an extruder drive motor EEPROM, an extruder drive fan tachometer, a liquefier heater power sensor, liquefier heater thermocouples, extruder portion EEPROM on the extruder, a tool base accelerometer, accumulator switches, filament bay drive motor current sensor, a filament bay drive motor encoder, a filament bay drive motor EEPROM, a print head alignment sensor, and a calculator configured to determine the useful life of the print heat-head and/or filament bay filament detection switches.

6. The 3D printer of claim 1, wherein the colored signal comprises a blinking light and a solid light of a first color being emitted.

7. The 3D printer of claim 1, wherein the colored signal is state independent, state dependent, or a combination thereof.

8. The 3D printer of claim 1, wherein the colored signal changes from a blinking light to a steady light of the same color as the sensed characteristic changes over time.

9. The 3D printer of claim 1, wherein the plurality of sensors comprises one or more sensors in each of the plurality of print heads, the plurality of sensors comprises:

a temperature sensor in a liquefier portion of the print head configured to detect a temperature proximate the liquefier portion;

an optical sensor configured to detect the presence of the filament; and/or a pressure sensor or strain gauge configured to detect a blockage in the liquefier portion.

10. A method of monitoring a status and health of a 3D printer, the method comprising:

providing a 3D printer comprising:

a chamber configured to receive extruded material to print a part;

a substantially enclosed tool chamber above the chamber, the substantially enclosed tool chamber comprising a viewing window and a tool rack therein;

a plurality of print heads, each of the plurality of print heads residing in a docked position on the tool rack and when not in use and configured to receive a thermoplastic-based filament, melt the filament, and deposit the melted filament to form the part, each of the plurality of print heads comprising an illuminated status indicator configured to emit a plurality of signals indicative of a status of or error in each of the plurality of print heads or a status of the 3D printer, wherein the illuminated status indicator faces the viewing window; and a plurality of sensors located on the print head or in the 3D printer and configured to detect a status of the print head or other printer components or an error in the print head or other printer components;

monitoring a status and health of the 3D printer based upon the emitted signals from the plurality of print heads during a print job;

maintaining the 3D printer based upon the emitted signals while the print job is taking place; and continuing to monitor the status and health of the 3D printer through light emitted from the plurality of print heads and maintaining the 3D printer based upon the emitted signals.

11. The method of claim 10, wherein the maintaining step comprises identifying a print head of the plurality of print heads as requiring attention based upon the emitted signals and locating the identified print head in the tool rack.

12. The method of claim 11, wherein the maintaining step further comprises maintaining or repairing the identified print head, while the identified printed head remains in the tool rack.

13. The method of claim 11, wherein the maintaining step further comprises:

removing the identified print head of the plurality of print heads from the tool rack;

repairing, maintaining or replacing the removed print head; and returning the repaired, maintained or replaced print head to the tool rack.

14. The method of claim 10, wherein the emitted signals comprise a first group of colors indicating that the printer is operating normally and a second group of colors indicating that an issue or potential issue is being sensed.

15. The method of claim 14, wherein the first group of colors comprises white, blue and green and/or the second group of colors comprises yellow, amber, orange and red.

16. The method of claim 15, wherein one of the emitted signals begins with the first group of colors and transitions to the second group of colors over time.

17. The method of claim 14, wherein both the first group of colors and the second group of colors are emitted as a steady light, a pulsing light or a flashing light to provide different signals relating to different sensed conditions.

18. The method of claim 10, wherein one of the emitted signals begins a blinking light and transitions to a solid light of the same color as the sensed characteristic changes over time.

19. The method of claim 10, wherein monitoring the status and health of the 3D printer comprises visually monitoring the status and health of the 3D printer.

20. The method of claim 10, wherein continuing to monitor the status and health of the 3D printer comprises continuing to monitor the status and health of the 3D printer until the print job is complete.

* * * * *